United States Patent
Stienhans

(10) Patent No.: US 7,860,974 B2
(45) Date of Patent: Dec. 28, 2010

(54) PROVIDING STATEFUL FAVORITES

(75) Inventor: Frank Stienhans, Wiesloch (DE)

(73) Assignee: SAP AG, Walldorf (DE)

( * ) Notice: Subject to any disclaimer, the term of this patent is extended or adjusted under 35 U.S.C. 154(b) by 1546 days.

(21) Appl. No.: 10/188,299

(22) Filed: Jul. 1, 2002

(65) Prior Publication Data

US 2003/0225891 A1 Dec. 4, 2003

Related U.S. Application Data

(60) Provisional application No. 60/384,620, filed on May 31, 2002.

(51) Int. Cl.
*G06F 15/16* (2006.01)

(52) U.S. Cl. .................... 709/227; 709/217

(58) Field of Classification Search ............ 709/202, 709/203, 221, 223, 225, 227, 229, 217, 219
See application file for complete search history.

(56) References Cited

U.S. PATENT DOCUMENTS

| | | | | |
|---|---|---|---|---|
| 5,826,242 | A * | 10/1998 | Montulli ................. | 705/27 |
| 6,480,852 | B1 * | 11/2002 | Himmel et al. ............ | 707/10 |
| 6,546,393 | B1 * | 4/2003 | Khan ..................... | 707/10 |
| 6,560,640 | B2 * | 5/2003 | Smethers ................. | 709/219 |
| 6,606,654 | B1 * | 8/2003 | Borman et al. ............ | 709/219 |
| 6,643,690 | B2 * | 11/2003 | Duursma et al. .......... | 709/217 |
| 6,704,024 | B2 * | 3/2004 | Robotham et al. ......... | 345/581 |
| 6,766,454 | B1 * | 7/2004 | Riggins .................. | 713/185 |
| 7,047,482 | B1 * | 5/2006 | Odom .................... | 715/500 |
| 7,290,061 | B2 * | 10/2007 | Lentini et al. ........... | 709/246 |
| 7,389,514 | B2 * | 6/2008 | Russell et al. ........... | 719/315 |
| 7,483,984 | B1 * | 1/2009 | Jonker et al. ............ | 709/226 |
| 2004/0031058 | A1 * | 2/2004 | Reisman ................. | 725/112 |
| 2005/0015775 | A1 * | 1/2005 | Russell et al. ........... | 719/315 |
| 2009/0319672 | A1 * | 12/2009 | Reisman ................. | 709/227 |

OTHER PUBLICATIONS

"Behaving yourself with IE 6.0", Tim Anderson, www.appdevadvisor.co.uk, Nov. 2001.
"saveFavorite Behavior", MSDN Library > Web Development > Behaviors > Default Behaviors Reference > © 2003 Microsoft Corporation.
"Favorites Persistence", www.webreference.com/js/column24/favorite, Aug. 28, 1998.
"Inside Knowledge", Aaron Skonnard, MSDN Home > Microsoft Internet Developer > Dec. 1999.
"Persistence", www.webreference.com/js/column24/favorite Aug. 1998.
Kristol et al., "HTTP State Management Mechanism," XP15007893, http://www.ietf.org/rfc/rfc2109.txt, Feb. 1997, pp. 1-21.

(Continued)

*Primary Examiner*—Asad M Nawaz
*Assistant Examiner*—Sargon N Nano
(74) *Attorney, Agent, or Firm*—Finnegan, Henderson, Farabow, Garrett & Dunner, LLP

(57) ABSTRACT

Methods and apparatus, including computer program products, implementing and using techniques for providing stateful favorites. A client creates a stateful favorite by sending a request for a reduced state of a stateful application session to a server. The client receives the reduced state from the server and stores the reduced state as a portion of the stateful favorite.

36 Claims, 9 Drawing Sheets

OTHER PUBLICATIONS

European Search Report dated Oct. 30, 2006.
Skonnard, Aaron, "Client Perspective," http://www.microsoft.com/mind/1299/inside/inside1299.asp, Dec. 1999, pp. 1-12.
Official Communication, mailed by the European Patent Office on Jul. 25, 2008, in corresponding Patent Application No. 02009955.2-1243, pp. 1-9.
Aaron Skonnard, "Client Persistence," http://www.microsoft.com/mind/1299/inside/inside1299.asp, Dec. 1999, pp. 1-12.
David Lane et al., "Web Database Applications with PHP & MySQL," Web Database Application with PHP and MySQL, Mar. 1, 2002, pp. 1-26.
Official Communication, mailed by the European Patent Office on Jul. 7, 2010, in corresponding Patent Application No. 10005183.8-1225, pp. 1-7.

* cited by examiner

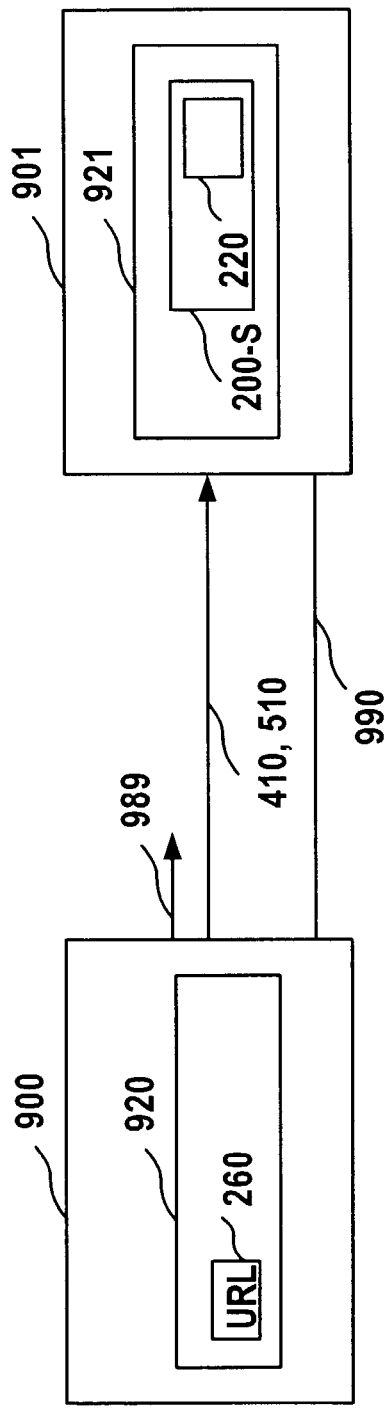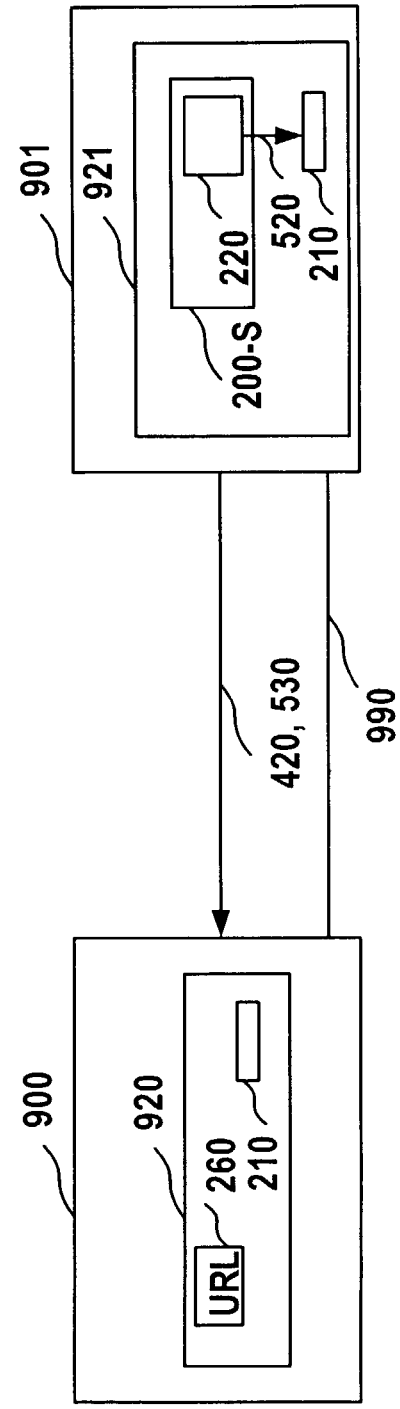

PROVIDING STATEFUL FAVORITES

CROSS-REFERENCE TO RELATED APPLICATIONS

This application claims the benefit of U.S. Provisional Application No. 60/384,620 filed on May 31, 2002.

BACKGROUND OF THE INVENTION

This invention relates to favorites in the context of browsers.

A browser is a computer program that is specifically designed to help users view and navigate hypertext, on-line documentation, or a database. The most common type of browser is the so-called web browser, which is a computer program that runs on a client computer and is used to access and display files and other data that is available to users on the Internet and other networks. Most conventional browsers, such as the Microsoft Internet Explorer, include a "Favorite" function. The Favorite function allows a user to add a representation (Favorite) of a web page, or other data that is accessible with the browser, to a "Favorites-Menu" in the browser. Conventionally, a Favorite is added by the user by using an "Add Favorite" function in the browser. Later on, the contents or application represented by the Favorite can be reloaded into the browser. If the application is a stateless application, in other words, if the current state of the application is available on the client, the current state of the application can be saved by the browser when the user adds the corresponding representation to the "Favorites-Menu". When the user returns to the content through the "Favorites-Menu", the state of the application is restored.

World Wide Web (WWW) concepts focus on stateless scenarios, where the client knows the complete state of the application. For many business related applications, stateless applications show insufficient performance because large amounts of data have to be transmitted from the server to the client to make all state information available on the client. Further, data traffic created by stateless business applications requires high-bandwidth communication lines between the server and the client. The "Add-Favorite"-function, as described above, does not support "Favorites" related to stateful applications, that is, applications that store the state on the server where the application is running, rather than on the client.

SUMMARY OF THE INVENTION

In general, in one aspect the invention provides methods and apparatus, including computer program products, implementing and using techniques for creating a stateful favorite on a client. A server a request for a reduced state of a stateful application session is sent from a client to a server. The reduced state from the server is received at the client and the reduced state is stored as a portion of the stateful favorite.

Advantageous implementations can include one or more of the following features. The reduced state can be received in a serialized data format. The stateful favorite can have a visual representation selected from the group of menu entry, shortcut, icon and hyperlink. The stateful favorite can include a title and a unique resource locator that corresponds to the stateful application session.

In general, in another aspect the invention provides methods and apparatus, including computer program products, implementing and using techniques for restoring a stateful application session on a server. The stateful application session that corresponds to a stateful favorite on a client is instantiated on the server. A reduced state of the stateful application session is received on the server, wherein the reduced state is a portion of the stateful favorite on the client. The reduced state is extended to a complete state of the stateful application session.

Advantageous implementations can include one or more of the following features. A logon of a user can be processed. The reduced state can be received in a serialized data format and the reduced state can be de-serialized.

In general, in another aspect the invention provides methods and apparatus, including computer program products, implementing and using techniques for providing a reduced state of a stateful application session, wherein the stateful application session has a complete state on a server. A request for the reduced state from a client is received at a server. The reduced state is extracted from the complete state, and the reduced state is sent to the client.

Advantageous implementations can include serializing the reduced state.

In general, in another aspect the invention provides methods and apparatus, including computer program products, implementing and using techniques for providing a reduced state of a stateful application session on a server. A state extractor includes instructions causing a processor of the server to extract the reduced state from a complete state of the stateful application session, wherein the server sends the reduced state to a client.

Advantageous implementations can include a serializer having a plurality of instructions causing the processor of the server to serialize the reduced state before sending.

In general, in another aspect the invention provides methods and apparatus, including computer program products, implementing and using techniques for restoring a stateful application session on a server. A state extender includes instructions causing a processor of the server to extend a reduced state of the stateful application session to a complete state of the stateful application session, wherein the server instantiates the stateful application session that corresponds to a stateful favorite on a client and wherein the reduced state is a portion of the stateful favorite on the client.

Advantageous implementations can include a de-serializer with instructions causing a processor of the server to de-serializing the reduced state when received from the client.

The invention can be implemented to realize one or more of the following advantages. A stateful favorite for a stateful application on a server is defined in a client program (for example by a user of the client program) without the need of favorite-information to be stored on the server. Therefore, management of stateful favorites can be handled completely by the client without the risk of leaving obsolete favorite-information on the server when, for example, deleting a stateful favorite on the client.

The client does not need to store a complete state of a favorite in the browser to restore the state of the session (also referred to as session-state) on the server. Because the session-state of a stateful application can reach several megabytes in size, extracting mandatory information from the session-state saves bandwidth in the client-server communication and further saves memory for storing the favorite on the client.

A stateful application behaves like a stateless application when using a corresponding stateful favorite in the browser of the client. That is, when creating a stateful favorite, a reduced state of the stateful application is transmitted from the server to the client. When executing the stateful favorite the reduced state is transmitted to the server similar to a stateless application.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 2A-C illustrate an example where a client and a server create a stateful favorite in accordance with the invention.

Like reference symbols in the various drawings indicate like elements.

DETAILED DESCRIPTION

Definition of Terms

Client: A computer that can access information stored on a server over a communication network, such as the Internet or a wireless network.

Server: A computer hosting information that can be accessed by client computers over a communication network, such as the Internet or a wireless network.

Application: A computer program running on a server or client computer with the purpose of carrying out one or more specific tasks.

Session: A session is an application instance running on a server for a specific user accessing the server through a browser.

Session-state: A session-state includes session-dependent information, such as identifiers of objects used by an application. The session-dependent information provides an environment to run an application instance of the application on a server. For convenience of explanation the "session-state" is referred to as "state" hereinafter.

Reduced state: A portion of a state that allows restoring the complete state of a session.

Stateful application: A stateful application holds its state on the server between transactions, where the corresponding application instance is running.

Stateless application: A stateless application does not hold its state on the server between transactions, where the corresponding application instance is running. The stateless application consequently has no awareness of its history. Instead, the state of the application instance depends entirely on the present input supplied to the server through the web browser on the client computer.

Stateful favorite: A stateful favorite is a shortcut to an application that can be used by a user to restore a state of a session on a server by launching the stateful favorite from the client. Stateful favorites can have a long lifetime and typically are valid even after a session ends. Stateful favorites can be included in the "Favorites-Menu" of a browser or made available as a shortcut on the client (for example, through an icon or a specific key-sequence).

Serialize: During serialization data is transformed into a serialized data format.

A Graphical User-Interface of a Stateful Application Session

FIGS. 1A-D illustrate an example of a graphical user-interface ("GUI") of a stateful application session at different time points T0, T1, T2 and T3. The following example describes the interaction of a user with a financial application through a graphical user-interface such as GUI 955. The scenario will be used as an example to describe one implementation of the present invention.

Figure 1B:
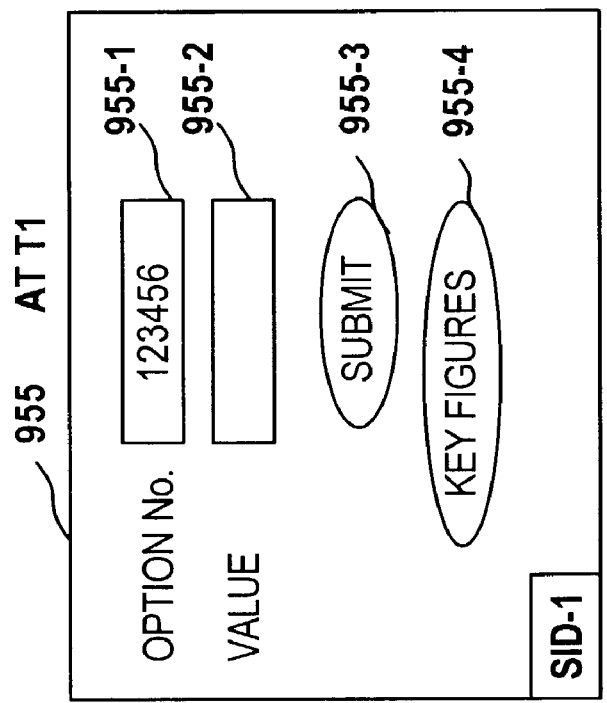
FIGS. 1A-D illustrate a graphical user-interface of a stateful application session in accordance with the invention.
Figure 1A:
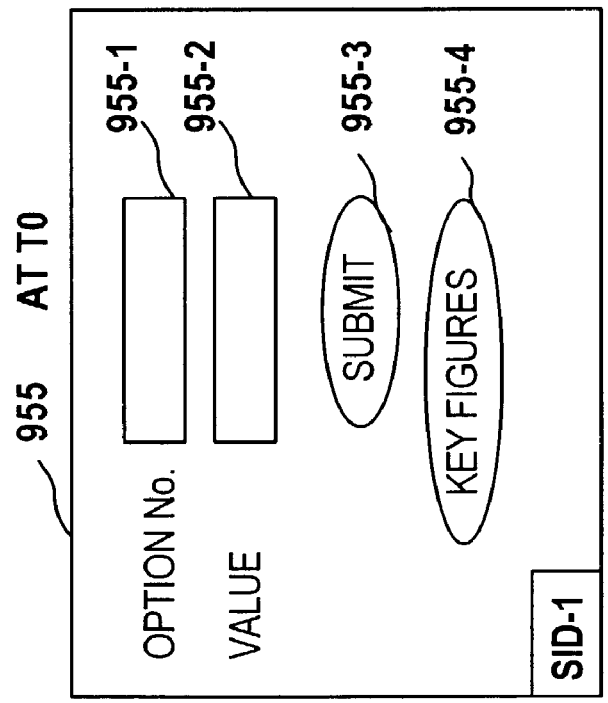

At T0 (FIG. 1A), the user gets prompted with graphical user-interface 955 (GUI). For example, the user interacts with a computer system through user-interface of client. GUI 955 is presented to the user through output device, such as a monitor or a PDA (Personal Digital Assistant) display, in a conventional browser. In the example, FIG. 1A illustrates the initial screen of a financial application session (also referred to as application session, hereinafter) that allows the user to query the value of a stock option. The initial screen has first screen identifier SID-1. The financial application session runs on a server in the computer system. The server stores the state of the session. GUI 955 includes components 955-1 to 955-4. OPTION No. component 955-1 is an entry field where the user indicates a number that identifies the option whose value is to be retrieved. VALUE component 955-2 is an output field where the retrieved option value is presented to the user. When the user starts the application session, for example by clicking on a corresponding menu entry in an application menu or on a corresponding shortcut or hyperlink on output device 950, components 955-1 and 955-2 are empty. This information is included in the state. The screen identifier SID-1 is also included in the state. SUBMIT component 955-3 and KEY FIGURES component 955-4 are components that are used by the user to launch requests to the application session on the server. For example, components 955-3, 955-4 are implemented in GUI 955 as push buttons, shortcuts, menu entries or the like.

At T1 (FIG. 1B), the user has entered a number, such as "123456", into OPTION No. 955-1. The state of the application session will include the value "123456" of OPTION No. component 955-1 when the information is sent to the server. The screen identifier is still SID-1 because the layout of the screen has not changed. The user then uses SUBMIT component 955-3 to trigger the retrieval of the option value.

At T2 (FIG. 1C), the server has retrieved the option value "2.41", which is presented to the user through VALUE component 955-2. The screen that is used to present the option value is still the screen with first screen identifier SID-1. The state of the application session now further includes the value "2.41" of VALUE component 955-2. The user uses KEY FIGURES component 955-4 to launch a request for information that further specifies option No. "123456".

At T3 (FIG. 1D), the server has retrieved key figure values for the leverage ("8.1"), volatility ("17.2%") and spread ("0.2") of the option. The key figure values are presented to the user in LEVERAGE component 955-5, VOLATILTIY component 955-6 and SPREAD component 955-7, respectively. These components were added to GUI 955 as a result of the interaction of the user with the KEY-FIGURES component 955-4 at T2. This can, for example, be achieved by replacing the screen having first screen identifier SID-1 with a further screen having second screen identifier SID-2. The state at T3 therefore further includes the additional components 955-5, 955-6, 955-7 and their key figure values as well as second screen identifier SID-2. In this example, the user is mainly interested in the analysis of stock option no. "123456" because he/she is interested in buying or selling the stock option at the right time. Therefore, the user wants to add a new stateful favorite entry to the browser's "Favorites" menu so that, when executing the new stateful favorite entry, the application session as of T3 is restored and presents up-to-date values to the user. For example, to achieve this, the user selects "ADD TO FAVORITES" from menu component 955-8. For example, the menu component 955-8 is part of the browser. In alternative implementations, the user can select a corresponding button, shortcut or the like. Preferably, the user gives a name, such as "option 123456", to the new stateful favorite entry, which can be used later on to identify the new stateful favorite entry.

The client then creates the new stateful favorite entry that stores a reduced state of the application session as of T3. The reduced state includes all information about the application session that is needed by the server to restore the application session at a later point in time. Therefore, the new stateful favorite entry is a stateful favorite according to an implementation of the present invention. For example, restoring the application session is triggered when the user selects the new stateful favorite entry in the "Favorites" menu or when the user executes a corresponding shortcut or link.

The following figures explain further details of implementations of the present invention with regards to the creation of the stateful favorite on the client.

Figure 2C:
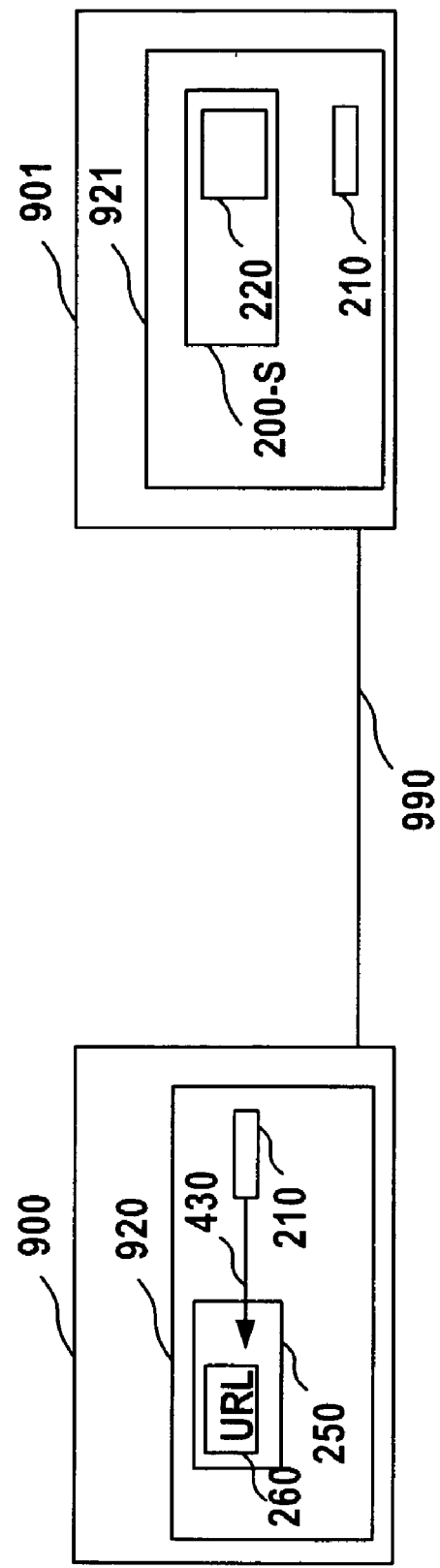

FIGS. 2A-C illustrate the client and server creating stateful favorite 250 in one implementation of the present invention. Each of the client and server has a memory. The client and server communicate over a network. When a first computer (for example, the client) sends data (for example, reduced state 210) to a second computer (for example, the server) in the computer system, actually a copy of the data is sent and the original data still exists on the first computer. For convenience of explanation, the same reference number is used for the original data and the sent copy.

In the example of FIG. 2A, the client serves to access application session 200-S that is running on the server through URL 260. Application session 200-S is an instance of a stateful application. Therefore, complete state 200 of application session 200-S is stored in memory 921 of the server. Referring back to the scenario of FIG. 1D, at T3, the user decides to create stateful favorite 250 (see FIG. 3C) on the client. When selecting the "ADD TO FAVORITES" function, the client sends 410 request 989. Server 901 receives 510 request 981. Request 981 requests the server to send reduced state 210 of application session 200-S to the client.

As shown in FIG. 2B, the server extracts 520 reduced state 210 from complete state 220. In one implementation of the present invention, extracting 520 includes the selection of relevant data of complete state 220 and the serialization of the relevant data. In another implementation, complete state 220 is serialized and the selection of relevant data is performed using the serialized data of complete state 220. Details of the extracting 520 step are explained in FIG. 3. Server 901 then sends reduced state 210 to the client. Upon having received 420 reduced state 210, reduced state 210 is available in memory 920. In other words, stateful application session 200-S behaves similar to a stateless application session. In the present invention, the user cannot distinguish whether he/she is working with a stateless or stateful application. This results in low training efforts for the user. However, a stateless application session always makes its complete state available at the client, whereas stateful application session 200-S merely makes a reduced state 210 available when the client requests it. Reduced state 210 includes all information that is required by the server to restore application session 200-S at a later point in time.

As shown in FIG. 2C, the client creates stateful favorite 250 in memory 900. For example, stateful favorite 250 can be created through the user selecting "ADD TO FAVORITES" or through dragging the URL 260 that corresponds to application session 200-S to, for example, the desktop. The URL is typically displayed in the browser. Alternative implementations for creating stateful favorite 250 include creating a shortcut on the desktop or using a hyperlink to access the "ADD TO FAVORITES" function. That is, stateful favorite 250 can have various visual representations (for example, menu entry, shortcut, icon, hyperlink, etc.). For example, the user or computer system assigns a title to stateful favorite 250 and the client stores 430 reduced state 210 as a portion of stateful favorite 250. For example, stateful favorite 250 is stored as file where the file name corresponds to the title of stateful favorite 250. Preferably, reduced state 210 is included in the file. For example, URL 260 can also be included in the file.

By sending reduced state 210 instead of complete state 220 to the client, less bandwidth is required from the client-server communication over network 990.

The reduced state 210 is sent from sever 901 to the client. Referring back to the example of FIGS. 1A-D, a stateless application session on the server would transfer its current state to the client at each time point T0 to T3. According to an implementation of the present invention, complete state 220 of application session 200-S is stored in memory 921 of the server. Sending reduced state 210 to the client on request 989 saves further bandwidth.

The stateful favorite 250 is administrated on the client. That is, when the user decides to delete a stateful favorite from memory 900, there is no need to notify the server, because the server has no knowledge of the stateful favorite on the client.

Figure 3:
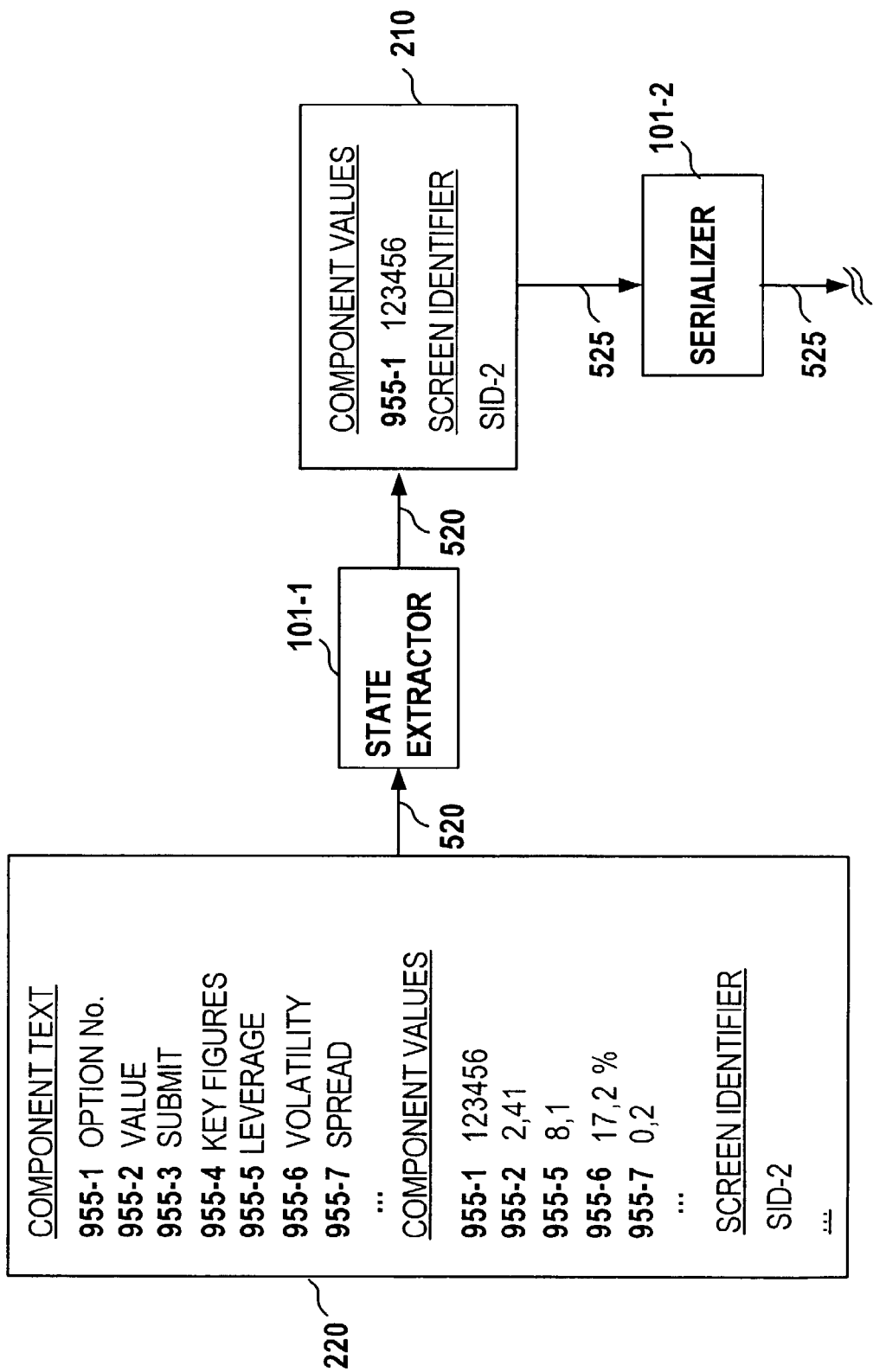
FIG. 3 illustrates details of extracting a reduced state from a complete state.

FIG. 3 illustrates details of extracting 520 reduced state 210 from complete state 220.

Figure 1D:
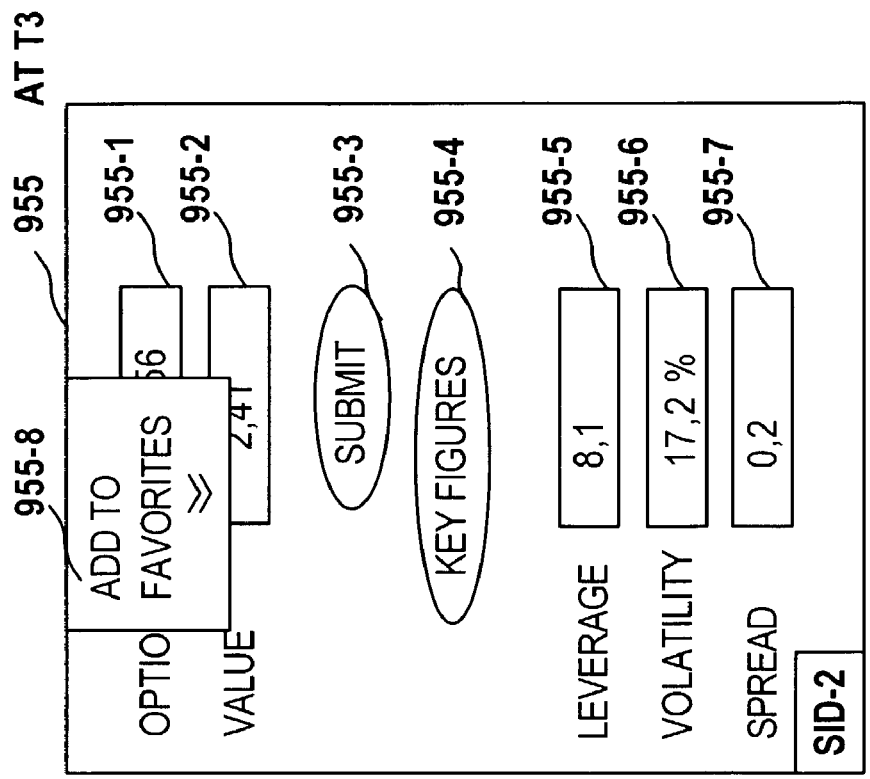
Figure 1C:
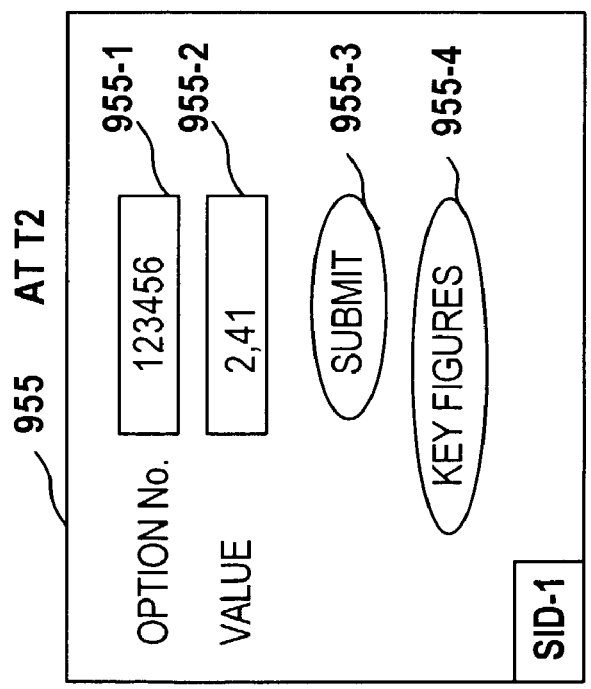

In terms of the example of FIG. 1D, at T3, complete state 220 includes information about the text of each component as illustrated in section COMPONENT TEXT. It further includes information about the value of each component as illustrated in section COMPONENT VALUE. It further includes information about the screen identifier as illustrated in section SCREEN IDENTIFIER. Further sections illustrated by " . . . " can be included in complete state 220 to store, for example, the current position of a cursor or of a scroll bar or any other element that specifies the appearance of GUI 955 at T3.

In one implementation of the present invention, state extractor 101-1 extracts 520 reduced state 210 from complete state 220. For example, state extractor 101-1 is a portion of computer program product running on the server to execute method 500 (see FIG. 7).

In the example of FIG. 1D, the information that is needed from complete state 220 to restore application session 200-S as of T3 is the value "123456" of the option number 955-1 in section COMPONENT VALUE of complete state 220 and the screen identifier SID-2 in section SCREEN IDENTIFIER of complete state 220. In the example, all texts in complete state's section COMPONENT TEXT and their corresponding display locations on the screen as well as the display locations of the values in section COMPONENT VALUE are defined on the screen having screen identifier SID-2. The values in section COMPONENT VALUE are refreshed automatically when restoring application session 200-S for option number "123456". Therefore, the value "123456" of the option number 955-1 in section COMPONENT VALUE of complete state 220 and the screen identifier SID-2 in section SCREEN IDENTIFIER of complete state 220 are included in the corresponding sections of reduced state 210. Therefore, state extractor 101-1 can be considered as an intelligent filter of state information. In one implementation of the present invention, state extractor 101-1 has information about the programming model of application 200 and, therefore, knows which information of a complete state of a specific application screen is essential to restore the specific application session at a later point in time. In another implementation, state-extractor can use the object model of application 200 or any other property of application 200 that identifies data representing essential information for restoring application session 200-S. At least all the essential information is included in the corresponding reduced state.

In one implementation of the present invention, the server serializes 531 reduced state 210 before sending 530 (see FIG. 3B) reduced state 210 to the client. Serializing 531 can, for example, be performed by serializer 101-2, which can be an optional computer program product residing on the server.

Figure 4A:
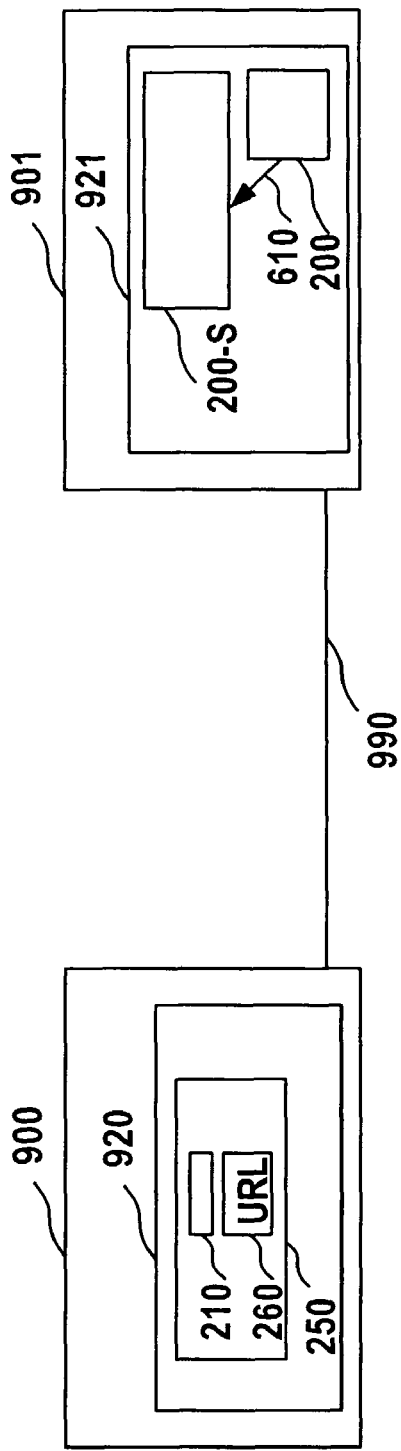
FIGS. 4A-C illustrate an example where the client and the server restore a stateful application session in accordance with the invention.
Figure 4B:
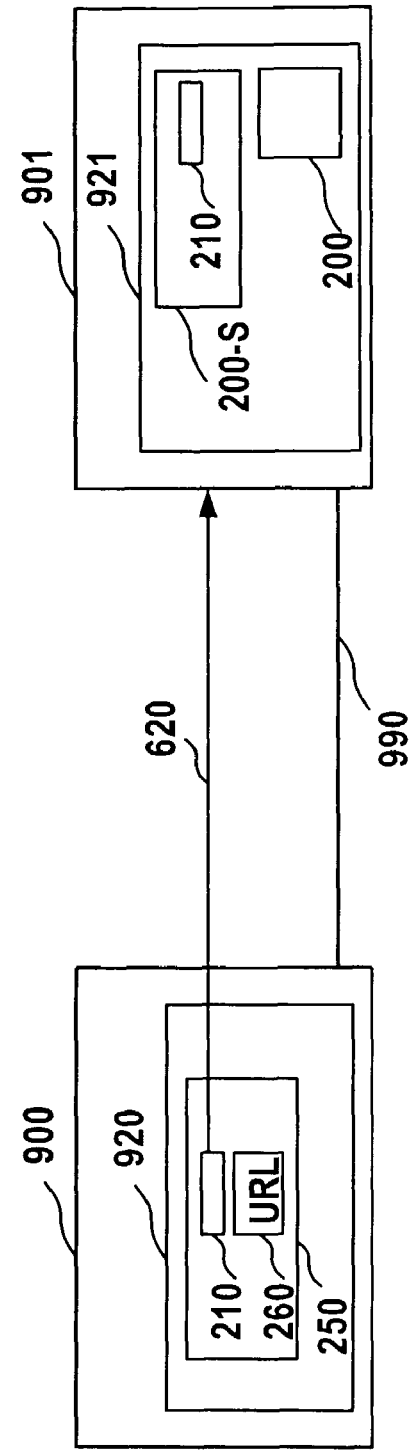
Figure 4C:
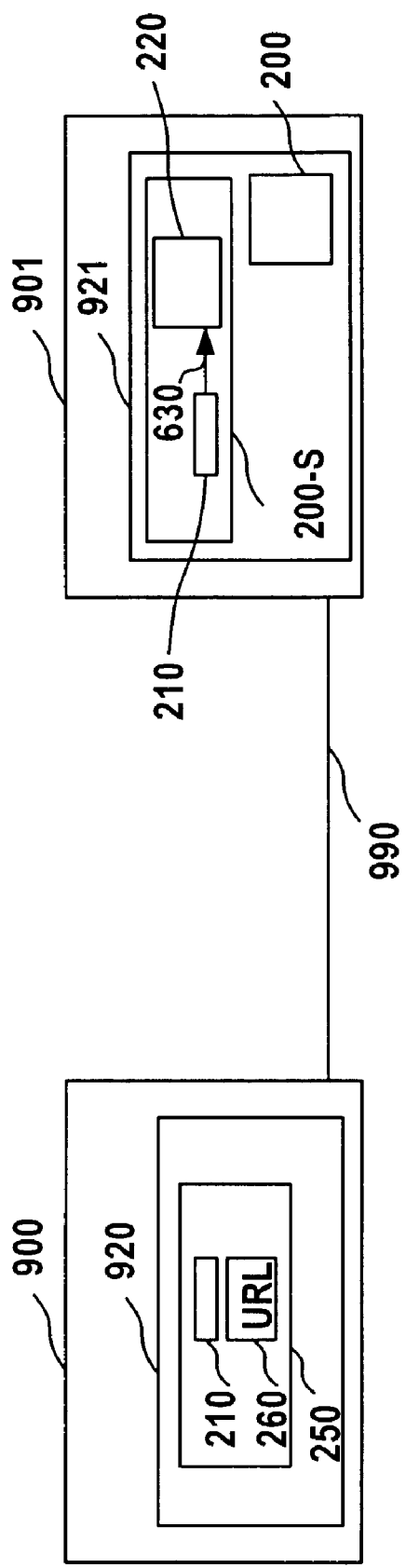

FIGS. 4A-C illustrate the client and the server when restoring application session 200-S in one implementation of the present invention.

In FIG. 4A, the user selects and executes stateful favorite 250, for example by clicking on the corresponding entry in the "Favorites-Menu" of the browser on the client or by using one of the other representations of stateful favorite 250 that are described under FIG. 3C. The client sends URL 260 to the server. Server 901 the instantiates 610 application session 200-S in memory 921 from stateful application 200, which is also stored in server memory 921 in the example. Stateful application 200 can be stored in any storage device of computer system. In the example, no instance (application session) of application 200 that corresponds to reduced state 210 is running on the server at the time when reduced state 210 is received from the client. In case a corresponding instance (session) is already running on the server, the instance can be replaced or a further instance can be instantiated. In one implementation of the present invention, the server can prompt the user with a logon screen through the client if application session 200-S requires user authentication. Upon the user having logged on, the server continues to restore application session 200-S. If stateful application 200 supports single sign on functionality (that is, an application where the user only identifies himself or herself once and authorizes the application to automatically identify the user to any other applications), the logon and authentication can be performed in the background without notifying the user.

In FIG. 4B, the server receives 620 reduced state 210 from the client. Reduced state 210 is loaded into application session 200-S. In one implementation of the present invention reduced state 210 is received as serialized data. Server 901 de-serializes the serialized data.

In FIG. 4C, the server extends 630 reduced state 210 into complete state 220 of application session 220-S. For example, this can be achieved by executing URL 260 with parameters that are included in reduced state 210. At this time, application session 200-S is fully restored on the server. Details of the extending 630 step are explained in FIG. 5.

Figure 5:
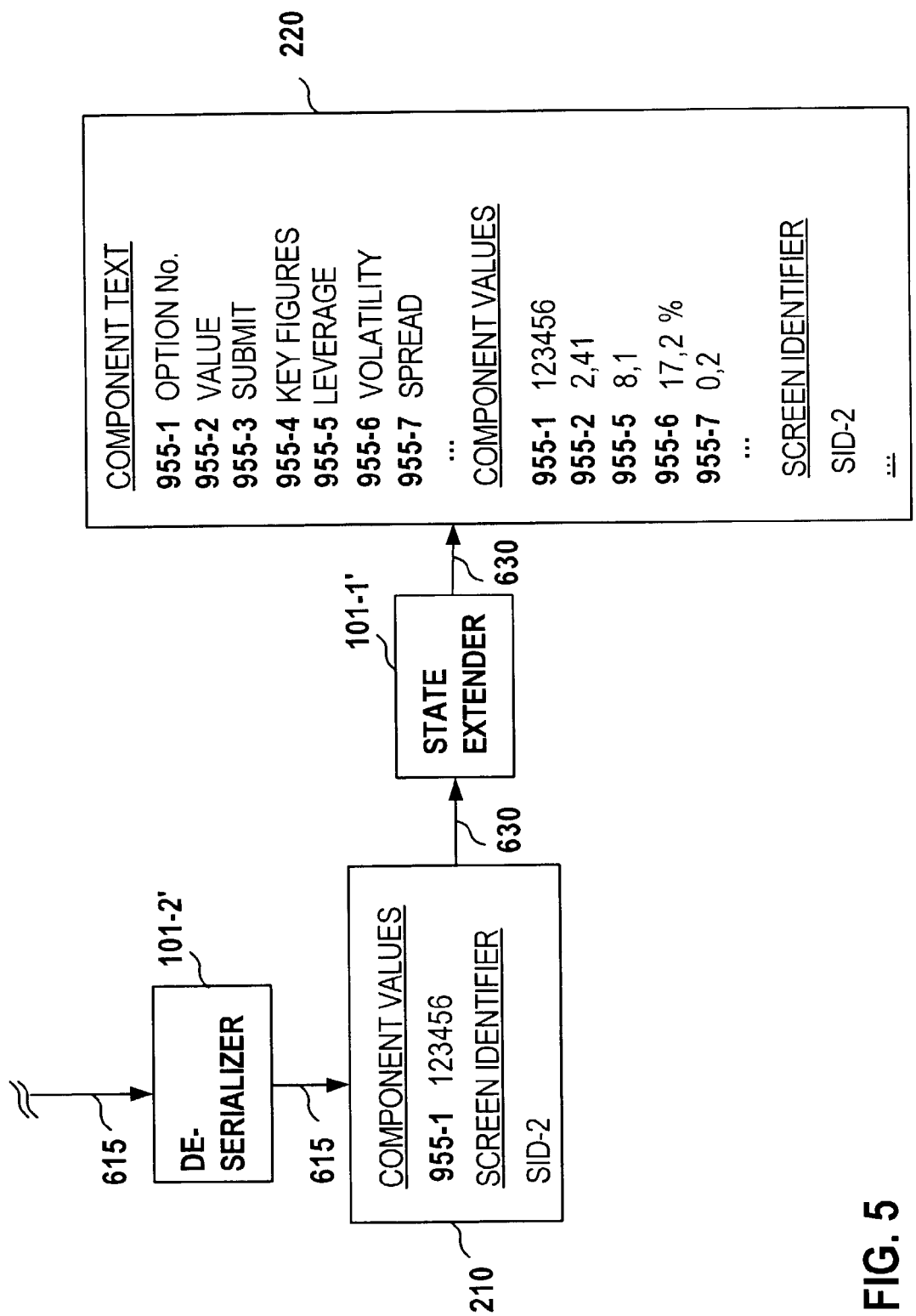
FIG. 5 illustrates details of extending the reduced state to the complete state.

FIG. 5 illustrates details of extending 620 reduced state 210 to complete state 220.

In the example of FIG. 1D, the information that is needed from complete state 220 to restore application session 200-S as of T3 is the value "123456" of the option number 955-1 in section COMPONENT VALUE of complete state 220 and the screen identifier SID-2 in section SCREEN IDENTIFIER of complete state 220.

In one implementation of the present invention, state extender 101-1' extends 620 reduced state 210 into complete state 220. For example, state extender 101-1' is a portion of a further computer program product running on the server to execute method 600 (FIG. 6). For example, state extender 101-1' executes the application corresponding to URL 260 (FIG. 4C) in application session 200-S (FIG. 4C) by using the values that are included in reduced state 210 as input parameters for the application. In the example, the same values as of T3 (FIG. 1D) are retrieved by the application and loaded into complete state 220 in the corresponding sections COMPONENT TEXT, COMPONENT VALUE, SCREEN IDENTIFIER, and further sections "...".

In case the values for components 955-1, 955-2, 955-6 or 955-7, for example, through a user change, since T3, the current values can be loaded into the complete state 220.

In one implementation of the present invention, the server de-serializes 615 reduced state 210 when receiving reduced state 210 from the client in a serialized data format. For example, de-serializing 615 is performed by de-serializer 101-2', which is an optional portion of computer program product 101'.

Figure 6C:
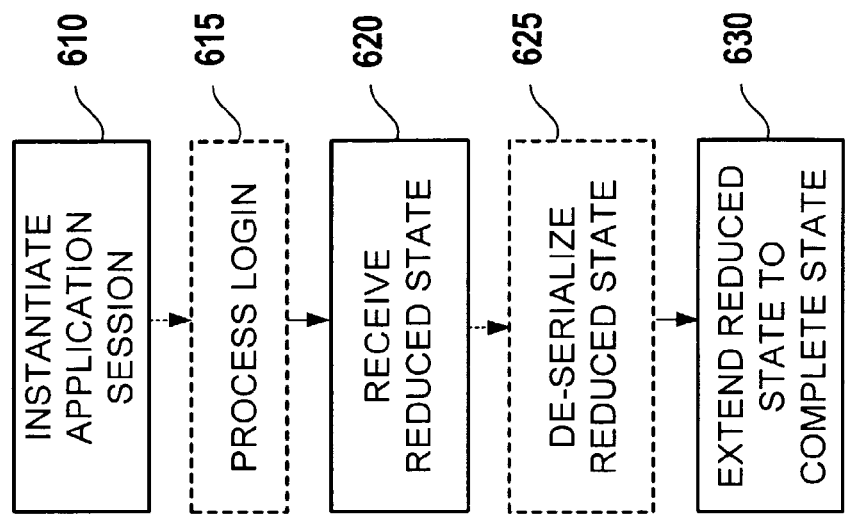
FIGS. 6A-C show methods for handling stateful favorites in accordance with the present invention.
Figure 6B:
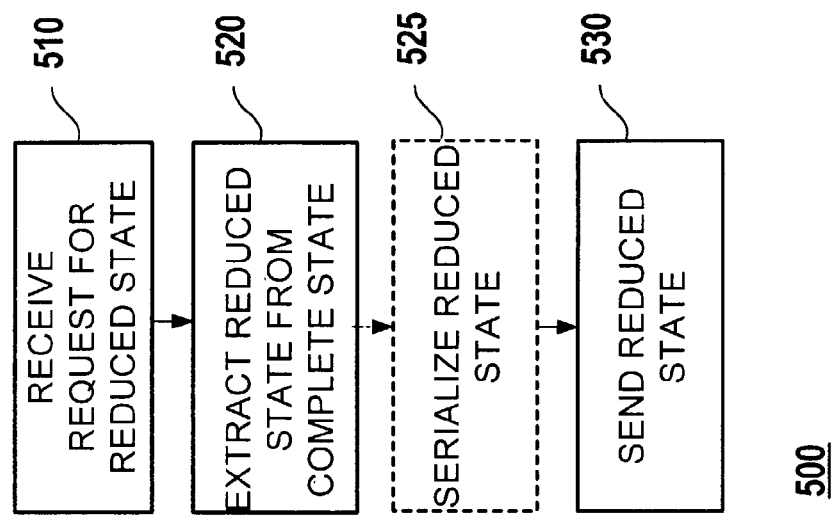
Figure 6A:
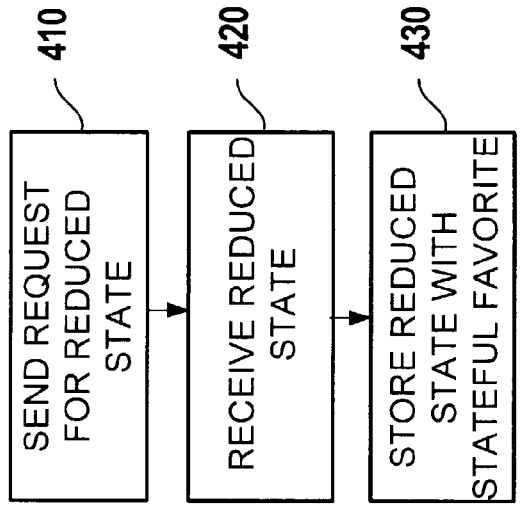

FIGS. 6A-C illustrate simplified flowcharts of methods 400, 500 and 600 for handling stateful favorites according to the present invention. Preferably, method 400 is executed by a client computer. For example, a computer program product can include instructions that cause a processor of the client to execute the steps of method 400. Method 400 is referred to as client method 400 in the following description. Preferably, methods 500, 600 are executed by the server. For example, a computer program product includes instructions that can cause a processor of the server to execute the steps of method 500. Method 500 is referred to as a first server method 500 in the following description. For example, a computer program product can include instructions that cause a processor of the server to execute the steps of method 600. Method 600 is referred to as second server method 600 in the following description.

As shown in FIG. 6A, client method 400 for creating stateful favorite 250 on the client includes the following steps:

Sending 410 request 989 for reduced state 210 of stateful application session 200-S from the client to the server.

Receiving 420 at the client reduced state 210 from the server.

Storing 430 reduced state 210 as a portion of stateful favorite 250.

Preferably, in the receiving 420 step reduced state 210 has a serialized data format.

FIG. 6B shows a simplified flow chart of first server method 500 for providing reduced state 210 of stateful application session 200-S, wherein stateful application session 200-S has complete state 220 on server 900. First server method 500 includes the following steps:

Receiving 510 at the server request 989 for reduced state 210 from the client.

Extracting 520 reduced state 210 from complete state 220.

Sending 530 reduced state 210 to the client.

Preferably, the server sends reduced state 210 in a serialized data format. Therefore, optionally, the server serializes 525 reduced state 210 before sending 530.

FIG. 6C shows a simplified flow chart of second server method 600 for restoring stateful application session 200-S on the server. Second server method 600 includes the following steps:

Instantiating 610 on the server stateful application session 200-S that corresponds to stateful favorite 250 on the client.

Receiving 620 reduced state 210 of stateful application session 200-S on the server, wherein reduced state 210 is a portion of stateful favorite 250 on the client.

Extending 630 reduced state 210 to complete state 220 of stateful application session 200-S.

In one implementation, reduced state 210 is received by the server in a serialized data format and optionally, the server de-serializes 625 reduced state 210 before extending 620.

In another implementation of the present invention, optionally, the server processes 615 a logon of the user to authenticate the user.

Table 1 provides a JavaScript example of client-side coding that can be used on the client. Table 1 can be a part of an HTML-page on the client, wherein the HTML-page represents application session 200-S running on the server. Those skilled in the art can use Table 1 to enable client method 400 and server methods 500, 600. A double asterisk (**) is used to indicate the start/end of comment sections in Table 1 to explain a previous portion of the coding example for those skilled in the art.

by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing

TABLE 1

```
<STYLE>.sFavorite {BEHAVIOR:
        url(#default#saveFavorite) }</STYLE>
** declaration for using a browser feature to locally save browser favorite data **
<SCRIPT>
    function getReducedState( )
    {
        var xmlhttp = new ActiveXObject("Msxml2.XMLHTTP");
        xmlhttp.Open("GET", location.href +
                "?favorite=yes", false);
        xmlhttp.Send( );
        return xmlhttp.responseXML;
    }
** getReducedState( ) requests reduced state 210 in an XML format from the server
** DOM
    function fnSaveReducedState( )
    {
        var data=getReducedState( );
        myForm.FavoriteStateControl.setAttribute
                ("sReducedState",data.xml);
    }
** fnSaveReducedState( ) loads reduced state 210 into the variable data and stores
data as attribute "sReducedState"of stateful favorite 250 ("myForm.FavoriteState Control")
**
        function fnSubmitReducedState( )
        {
            myForm.FavoriteStateControl.value=
            myForm.FavoriteStateControl.getAttribute
                ("sReducedState");
            myForm.submit( );
        }
** fnSubmitReducedState( ) retrieves reduced state 210 from stateful favorite 250 and
sends reduced state 210 to the server to restore application session 200-S **
    </SCRIPT>
    <input id="FavoriteStateControl"class="sFavorite" type="hidden"
onload="fnSubmitReducedState( )"onsave="fnSaveReducedState( )">
** input field (that is hidden in the example but can be visible) that restores application
session 200-S when stateful favorite 250 is executed (onload) and that saves reduced state
210 with stateful favorite 250 when, for example, storing stateful favorite 250 (onsave). **
```

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device, such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication.

The invention has been described in terms of particular implementations. Other implementations are within the scope of the following claims. For example, the steps of the invention can be performed in a different order and still achieve desirable results. Other types of GUI and applications can benefit from the invention.

What is claimed is:

1. A method for creating a stateful favorite on a client, comprising:
    sending from the client to a server a request for a reduced state of a stateful application session;
    receiving at the client the reduced state from the server; and
    storing the reduced state as a portion of a stateful favorite, wherein the request for the reduced state contains at least some information that is also contained in the received reduced state.

2. The method of claim 1, wherein the reduced state is received in a serialized data format.

3. The method of claim 1 wherein the stateful favorite has a visual representation being a menu entry, shortcut, icon, or hyperlink.

4. The method of claim 2, wherein the stateful favorite has a visual representation being a menu entry, shortcut, icon, or hyperlink.

5. The method of claim 1, 2, 3 or 4, wherein the stateful favorite further comprises a title and a unique resource locator that corresponds to the stateful application session.

6. A method for restoring a stateful application session on a server comprising:
    instantiating on the server the stateful application session that corresponds to a stateful favorite on a client;
    receiving on the server a reduced state of the stateful application session, wherein the reduced state is a portion of the stateful favorite on the client; and
    extending the reduced state to a complete state of the stateful application session,
    wherein the reduced state contains at least some information that is also contained in the complete state.

7. The method of claim 6, further comprising processing a logon of a user.

8. The method of claim 6 or 7, wherein the reduced state is received in a serialized data format and the method further comprises the step of de-serializing the reduced state.

9. A method for providing a reduced state of a stateful application session, wherein the stateful application session has a complete state on a server, comprising:
    receiving at the server a request for the reduced state from a client;
    extracting the reduced state from the complete state; and
    sending the reduced state to the client,
    wherein the request for the reduced state contains at least some information that is also contained in the complete state.

10. The method of claim 9, wherein the method further comprises the step of serializing the reduced state.

11. A computer program product, tangibly embodied in a non-transitory computer-readable storage medium, for creating a stateful favorite on a client, and containing instructions that, when executed by a processor, perform a method comprising:
    sending from the client to a server a request for a reduced state of a stateful application session;
    receiving at the client the reduced state from the server; and
    storing the reduced state as a portion of a stateful favorite, wherein the request for the reduced state contains at least some information that is also contained in the received reduced state.

12. The product of claim 11, wherein the reduced state is received in a serialized data format.

13. The product of claim 11, wherein the stateful favorite has a visual representation being a menu entry, shortcut, icon, or hyperlink.

14. The product of claim 12, wherein the stateful favorite has a visual representation being a menu entry, shortcut, icon, or hyperlink.

15. The product of claim 11, 12, 13 or 14 wherein the stateful favorite further comprises a title and a unique resource locator that corresponds to the stateful application session.

16. A computer program product, tangibly embodied in a non-transitory computer-readable storage medium, for restoring a stateful application session on a server and containing instructions that, when executed by a processor, perform a method comprising:
    instantiating on the server the stateful application session that corresponds to a stateful favorite on a client;
    receiving on the server a reduced state of the stateful application session, wherein the reduced state is a portion of the stateful favorite on the client; and
    extending the reduced state to a complete state of the stateful application session, wherein the reduced state contains at least some information that is also contained in the complete state.

17. The product of claim 16, further comprising instructions to process a logon of a user.

18. The product of claim 16 or 17, wherein the reduced state is received in a serialized data format and the product further comprises instructions to de-serialize the reduced state.

19. A method for providing a reduced state of a stateful application session, wherein the stateful application session has a complete state on a server, comprising:
    receiving at the server a request for the reduced state from a client;
    extracting the reduced state from the complete state; and
    sending the reduced state to the client,
    wherein the request for the reduced state contains at least some information that is also contained in the complete state.

20. The method of claim 19, wherein the method further comprises the step of serializing the reduced state.

21. A computer program product, tangibly embodied in a non-transitory computer readable storage medium, for providing a reduced state of a stateful application session, and containing instructions that, when executed by a processor, perform a method comprising:

receiving at the server a request for the reduced state from a client;

extracting the reduced state from the complete state; and sending the reduced state to the client, wherein the request for the reduced state contains at least some information that is also contained in the complete state.

22. The product of claim 21, further comprising instructions to serialize the reduced state.

23. A computer program product, tangibly embodied in a non-transitory computer-readable storage medium, for restoring a stateful application session on a server, and containing instructions that, when executed by a processor, perform a method comprising:

instantiating on the server the stateful application session that corresponds to a stateful favorite on a client;

receiving on the server a reduced state of the stateful application session, wherein the reduced state is a portion of the stateful favorite on the client; and extending the reduced state to a complete state of the stateful application session, wherein the reduced state contains at least some information that is also contained in the complete state.

24. The product of claim 23, further comprising instructions operable to process a logon of a user.

25. The product of claim 23 or 24, further comprising instructions operable to de-serialize the reduced state.

26. A computer program product, tangibly embodied in a non-transitory computer-readable storage medium, for providing a reduced state of a stateful application session on a server, and containing instructions that, when executed by a processor, perform a method comprising:

causing a processor of the server to extract the reduced state from a complete state of the stateful application session, wherein the server sends the reduced state to a client, wherein the reduced state contains at least some information that is also contained in the complete state.

27. The computer program product of claim 26, further comprising:

a serializer having a plurality of instructions causing the processor of the server to serialize the reduced state before sending.

28. A computer program product, tangibly embodied in a non-transitory computer-readable storage medium for restoring a stateful application session on a server, and containing instructions that, when executed by a processor, perform a method comprising:

causing a processor of the server to extend a reduced state of the stateful application session to a complete state of the stateful application session, wherein the server instantiates the stateful application session that corresponds to a stateful favorite on a client and wherein the reduced state is a portion of the stateful favorite on the client, wherein the reduced state contains at least some information that is also contained in the complete state.

29. The computer program product of claim 28 further comprising:

a de-serializer having a plurality of instructions causing a processor of the server to de-serializing the reduced state when received from the client.

30. A client in a computer system for creating a stateful favorite on the client; the client running a computer program for executing the following steps:

sending from the client to a server a request for a reduced state of a stateful application session;

receiving at the client the reduced state from the server; and storing the reduced state as a portion of the stateful favorite, wherein the request for the reduced state contains at least some information that is also contained in the received reduced state.

31. The client of claim 30, wherein the receiving step receives the reduced state in a serialized data format.

32. The client of claim 30, wherein the stateful favorite has a visual representation selected from the group of menu entry, shortcut, icon and hyperlink.

33. The client of claim 30, wherein the stateful favorite further comprises a title and a unique resource locator that corresponds to the stateful application session.

34. A server for restoring a stateful application session, the server running a computer program operable to execute the following steps:

instantiate on the server the stateful application session that corresponds to a stateful favorite on a client;

receive on the server a reduced state of the stateful application session, wherein the reduced state is a portion of the stateful favorite on the client; and extend the reduced state to a complete state of the stateful application session, wherein the reduced state contains at least some information that is also contained in the complete state.

35. The server of claim 34 wherein the computer program is further operable to process a logon of a user.

36. The server of claim 34, wherein the computer program is further operable to de-serialize the reduced state.

* * * * *